51.7 grams of this N-acetyl compound and 1.52 liters of a mixture of concentrated hydrochloric acid and glacial acetic acid (1:1) are heated at the boiling point under reflux for 1 hour. After cooling, the mixture is suction filtered and the residue is washed with aqueous hydrochloric acid solution and dried. 30 grams of 1-(5-nitro - 2-furyl)-2-(5-amino-1,3,4-thiadiazolyl-2)-ethylene are thereby obtained in the form of the hydrochloride, having a melting point of 260° C. (decomposition). After recrystallization from about 3% hydrochloric acid or a mixture of 10% hydrochloric acid and glycol (1:1), the decomposition point remains unchanged.

$C_8H_6N_4O_3S \cdot HCl$ (274.5): Calculated: S, 11.63%; Cl, 12.9%. Actual: S, 11.5%; Cl, 12.77%.

The amino compound separated from the hydrochloride by treatment with dilute caustic soda solution is a red product which decomposes at 288° C.

EXAMPLE IX 1-(5-nitro-2-furyl)-2-(4,6-diacetamido-2-triazyl)-ethylene 7.05 grams of 5-nitro-2-fural, 10.45 grams of 2-methyl-4,6-diacetamido-triazine and 5 ml. of acetic anhydride are boiled under reflux for 3 hours (bath temperature 190° C.). The mixture is then vacuum concentrated and the concentrate is extracted with isopropylether. The undissolved concentrate is boiled with 200 ml. of glacial acetic acid, filtered free of any undissolved residue, and the filtrate is crystallized. The crystalline product and the residue remaining undisolved in the acetic acid are combined and recrystallized from dioxan. There are obtained 6 grams of 1-(5-nitro-2-furyl)-2-(4,6-diacetamido-2-triazyl)-ethylene, having an M.P. of 260–262° C. Another 1.5 grams, having a melting point of 260–262° C., can be obtained by concentration from the dioxan and acetic acid mother liquors.

$C_{13}H_{12}N_6O_5$ (332): Calculated: C, 46.95%; H, 3.61%; N, 25.32%; $CH_3CO$, 25.9%. Actual: C, 46.73%; H, 3.59%; N, 24.99%; $CH_3CO$, 26.12%.

EXAMPLE X 1-(5-nitro-2-furyl)-2-(2-thiazolyl)-ethylene

A mixture of 1.5 grams of 2-methyl-thiazole, 3 grams of acetic anhydride, 0.9 gram of acetic acid and 2.1 grams of 5-nitro-2-fural are heated for 2 hours at 160° C. After cooling, the precipitated product is suction filtered and washed with glacial acetic acid (1.5 grams). The solid residue is dissolved in hot benzene, filtered free of any undissolved material and vacuum concentrated to dryness. There are obtained 1.25 grams of 1-(5-nitro-2-furyl)-2-(2-thiazolyl)-ethylene, having an M.P. of 154–156° C. (recrystallized from acetonitrile).

$C_9H_6N_2O_3S$ (222): Calculated: N, 12.61%; S, 14.43%. Actual: N, 12.68%; S, 14.4%.

EXAMPLE XI 1-(5-nitro-2-furyl)-2-(6-methylmercapto-3-pyridazyl)-ethylene 12.85 grams of 3-methyl-6-chloro-pyridazine are dissolved in 150 ml. of methanol and 150 ml. of a solution of 5.8 grams of sodium and 12 grams of methylmercaptan in 250 ml. methanol are added with stirring over a period of 30 minutes at 50° C. Stirring is continued for a further 1½ hours. The mixture is concentrated in vacuo and the residue is dissolved in chloroform. The clear solution, following evaporation of the organic solvent, is subjected to vacuum-fractionation. There are obtained 5 grams of 3-methyl-6-methylmercapto-pyridazine, having a B.P.$_{12}$ of 110–125° C.

1.4 grams of this liquid are boiled with 10 ml. of acetic anhydride, 5 ml. glacial acetic acid and 1.41 grams 5-nitro-2-fural for 3 hours under reflux (160° C. bath temperature). The mixture is then evaporated to dryness and the residue is extracted with ether, heated to boiling with dioxan and the dioxan solution thus obtained concentrated. 1 gram of 1-(5-nitro-2-furyl)-2-(6-methylmercapto-3-pyridazyl)-ethylene, having an M.P. of 208–209° C. is obtained.

$C_{11}H_9N_3O_3S$ (263): Calculated: C, 50.2%; H, 3.42%; S, 12.17%. Actual: C, 50.3%; H, 3.37%; S, 12.2%.

EXAMPLE XII 1-(5-nitro-2-furyl)-2-(6-methylsulfonyl-3-pyridazyl)-ethylene 1.32 grams of the compound prepared in accordance with Example XI are dissolved in 100 ml. of warm chloroform, and at room temperature, 104 ml. of a solution of 2.21 grams perbenzoic acid in 104 ml. chloroform are added. The crystalline product which is produced following standing of the mixture overnight is suction filtered and washed with chloroform. 1 gram of 1-(5-nitro-2-furyl)-2-(6-methylsulfonyl-3-pyridazyl)-ethylene, having an M.P. of 218–219° C., is recovered. The oxidation can also be satisfactorily performed using potassium permanganate in place of perbenzoic acid.

$C_{11}H_9N_3O_5S$ (295): Calculated: C, 44.75%; H, 3.05%; N, 14.23%; S, 10.85%. Actual: C, 44.65%; H, 3.32%; N, 13.97%; S, 10.9%.

EXAMPLE XIII 1-(5-nitro-2-furyl)-2-(5-methylsulfonylamino-1,3,4-thiadiazolyl-2)-ethylene 0.55 gram of the compound prepared according to preceding Example VIII is suspended in 12.5 ml. of absolute pyridine, and 0.73 gram of absolute triethylamine is added to the resulting suspension. 0.5 gram of methanesulfochloride, which has been dissolved in 2 ml. of absolute dioxan, is then added dropwise, with stirring, over a period of 30 minutes, and the stirring is continued for 1½ hours at 50° C. After cooling, the mixture is suction filtered and the residue is washed with absolute dioxan and the combined filtrate vacuum dried. The residue recovered (1 gram) is dissolved in water. 2 N soda solution is added, and any undissolved matter is removed by suction filtering. The filtrate is acidified with concentrated hydrochloric acid. The yellow crystalline product, which thereby forms, melts, after washing with water, at 259–260° C. (decomp.). The yield of 1-(5-nitro-2-furyl) - 2 - (5-methylsulfonylamino-1,3,4-thiadiazolyl-2)-ethylene amounts to 0.45 gram.

$C_9H_8N_4O_5S_2$ (316): Calculated: C, 34.18%; H, 2.53%; S, 20.27%. Actual: C, 34.22%; H, 2.49%; S, 20.2%.

EXAMPLE XIV 1-(5-nitro-2-furyl)-2-(6-dimethylolmethylamino-3-pyridazyl)-ethylene 2.84 grams of a mixture of 3-methyl-6-chloro-pyridazine and 3-methyl-6-bromopyridazine (approx. ⅓ : ⅔) and 14.5 grams 2-amino-propanediol-(1,3) are heated together for 4 hours at 120° C. (bath temp.). The clear solution is diluted, after cooling, with 50 ml. water. 25 ml. concentrated caustic soda solution are added with cooling, and the solution is repeatedly extracted with benzene to remove any unreacted 6-halogen-3-methyl-pyridazine. The aqueous phase, after the addition of 10 grams of anhydrous soda, is extracted 5 times with about 30 to 50 ml. portions of dioxan, and the combined dioxan, and the combined dioxan extracts, after drying over anhydrous soda, are concentrated in vacuum. The concentrate recovered amounts to 1 gram of syrupy 3-methyl-6-(dimethylol-methylamino)-pyridazine. From the aqueous alkaline phase, another 0.8 gram of the compound can be obtained by adding to the aqueous phase an additional 10 grams of anhydrous soda and extracting 5 times with dioxan.

1 gram of the crude product thus obtained is heated for 30 minutes with 5.5 ml. of acetic anhydride at 120° C; 0.77 gram of 5-nitro-2-fural is added and the mixture is maintained another 3 hours at 120° C. (bath temperature). After cooling, 70 ml. of benzene are added and the resulting precipitate is filtered out (0.14 gram). The clear solution is vacuum concentrated. The residue is extracted several times with isopropylether (to remove acetic acid, acetic anhydride and any unreacted nitrofural) and decanted each time. The residue which remains undissolved in isopropyl ether is now boiled with 17 ml. of 5 N hydrochloric acid for 1 hour under reflux. The solution is diluted with water and treated with 0.8 gram of activated charcoal following filtration, 2 N soda solution is added to the clear aqueous solution and the pH adjusted to about pH 8–9. The solution is repeatedly extracted with acetic acid ester. The combined acetic ester extracts are vacuum dried. There is obtained 0.35 gram of residue. After recrystallization from 10 ml. of isopropanol, 0.15 gram of 1-(5-nitro-2-furyl)-2-(6-dimethylolmethylamino-3-pyridazyl)-ethylene, having a melting point of 170–172° C., are obtained. The red crystals can be recrystallized out of water; they dissolve in dilute hydrochloric acid producing a yellow colored solution, and can be precipitated again as red colored crystals by adding sodium bicarbonate.

EXAMPLE XV

Quaternary ammonium salt of 1-(5-nitro-2-furyl)-2-(6-amino-3-pyridazyl)-ethylene and ethylenechlorhydrin 0.93 gram of 1-(5-nitro-2-furyl)-2-(6-amino-3-pyridazyl)-ethylene (made by treating the hydrochloride produced in Example II with dilute caustic soda solution) is suspended in 10 ml. of ethylenechlorhydrin and then heated for 3 hours at 135° C. (bath temperature). The clear solution is then vacuum concentrated to about half its volume, precipitated with ether and suction filtered. The crystalline product obtained is recrystallized from 7.5 ml. of a mixture of 85% dioxan and 15% normal hydrochloric acid, any undissolved substance being removed. The product obtained (0.65 gram, M.P. 225° C. with decomposition) is dissolved with heat in 15 ml. of water. Sodium bicarbonate is added at room temperature to adjust the solution to a pH of 7–8, and the solution is allowed to stand for 30 minutes at room temperature. Thereafter, it is suction filtered and the residue washed with water. The yield amounts to 0.45 gram. The substance, after recrystallization from 4 ml. of 80% aqueous dioxan (some insoluble matter is separated out), melts with decomposition at 194° C. (0.32 gram); it is difficultly soluble in cold water, but easily soluble in very dilute aqueous solution of acetic acid.

EXAMPLE XVI 1-(5-nitro-2-furyl)-2-(5-methylureido-1,3,4-thiadiazolyl-2)-ethylene 0.69 gram of methylisocyanate is dissolved in 40 ml. of dry pyridine, and 1.9 grams of the 1-(5-nitro-2-furyl)-2-(5-amino-1,3,4-thiadiazolyl-2)-ethylene, prepared as set out in Example VIII, are added. The mixture is stirred for 15 minutes at 80° C. After cooling, the yellow crystals are suction filtered and washed with pyridine. 2 grams of 1-(5-nitro - 2-furyl)-2-(5 - methylureido - 1,3,4-thiadiazolyl-2)-ethylene are thereby obtained. After recrystallization from 10 ml. of dimethylformamide, the product melts at 267–268° C. with decomposition (turns brown after 220° C.). To purify this urea derivative, 1 gram of the product is suspended in water and 2 N caustic soda solution is added until solution sets in. A small amount of undissolved matter is filtered out and the dark red solution is acidified with glacial acetic acid, whereupon an amorphous mass precipitates. The mixture is then heated briefly to 60° C. and allowed to cool. The crystals are then suction filtered and washed first with water and then with ether. The yield amounts to 0.8 gram. After recrystallization from dimethylformamide, the melting point is still 267–268° C. (decomposition).

$C_{10}H_9N_5O_4S$ (295): Calculated: S. 10.85%. Actual: S, 10.8%.

Found equivalent weight. 298 (titrated with tetrabutylammonium hydroxide in methyl ethyl ketone).

The compounds of the invention are preferably administered orally in tablets or elixirs in conjunction with suitable carriers and other types of oral pharmaceutical dosage units. The compounds of the invention may also advantageously be prepared as preparations having water-miscible vehicles of low surface tension which mix with wound exudates, penetrate fissures and reach infected areas. Most advantageously, where topical administration is indicated, the compounds dissolved in nonaqueous hygroscopic liquid vehicles, as for example polyethylene glycol or with the compounds in the form of an aqueous solution thereof, may be applied as drops or to a dressing or directly to the wound. Additionally, the compounds may be prepared for use as ointments in petrolatum, water soluble ointment-like bases, as for example of polyethylene glycols. The compounds of the invention may also advantageously be prepared for spraying, as for example in a water-miscible vehicle, i.e., polyethylene glycol, wetting agent and water. The compounds of the invention in the form of suppositories, that is in a water-miscible or water dispersible base, are advantageously used in urethral and vaginal infections. Similarly, the compounds of the invention can be prepared a soluble powders, as for instance in a powder base composed of water soluble polyethylene glycols, or alternatively lactose, dextrose and citric acid. Still one other instance of a method of administering the compounds herein claimed is in the form of an oral suspension thereof, as for example in a water-miscible custard flavored gel.

Extensive laboratory tests have established the 5-nitrofuran derivatives of the invention as extremely effective anti-microbials of low-toxicity. Their anti-microbial effectiveness is far beyond that of the known nitrofuran anti-microbial agents.

A number of compounds in accordance with the invention were expressly compared with Furacin (5-nitro-2-furaldehyde semicarbazone), Eaton Labs., Norwich, New York, and Furaspor((5-nitro-2-furfuryl)-methyl ether), Eaton Labs., Norwich, New York, with respect to their anti-microbial activity bacteria and fungi respectively. The results of the comparison are set out in the following table:

| Application Ex. No. | Effectiveness Factors Compared with Furacin in the Case of— Bacteria | | | Effectiveness Factors Compared with Furaspor in the Case of— Fungi | | | |
|---|---|---|---|---|---|---|---|
| | Staphylococcus aureus | Streptococcus pyogenes | Escherichia coli | Condida abincans | Microsporum gypseum | Trichophyton mentagrophytes | Aspergillus niger |
| II | 32 | 32 | 256 | 0.5 | 4 | 4 | <2 |
| I | 32 | 16 | 256 | <1 | 16 | 8 | <2 |
| XVI | 64 | 32 | 16 | <0.125 | 1 | 4 | <1 |
| XIV | 4 | 16 | 32 | <2 | <4 | <4 | <4 |
| XV | 16 | 8 | 16 | <2 | <4 | <4 | <4 |
| VIII | 16 | 2 | 32 | 0.25 | 4 | 2 | <1 |
| X | 4 | 0.25 | 128 | 16 | 64 | 128 | 64 |
| IV | 2 | 0.25 | 32 | 8 | 64 | 64 | 32 |
| XI | 8 | 0.5 | 512 | <2 | 128 | 32 | 64 |

United States Patent Office 3,491,091
Patented Jan. 20, 1970

3,491,091
5-NITROFURAN DERIVATIVES
Herbert Berger, Sulzberg, Allgau, and Erich Haack and Johann Daniel Achelis, Heidelberg, and Wolfgang Vomel, Mannheim, Germany, assignors to C. F. Boehringer & Soehne Gesellschaft mit beschrankter Haftung, Mannheim-Waldhof, Germany, a corporation of Germany
No Drawing. Filed Mar. 19, 1963, Ser. No. 266,181
Claims priority, application Germany, Mar. 28, 1962, 66,565
Int. Cl. C07d 99/10, 99/04; A61k 27/00
U.S. Cl. 260—240
10 Claims

ABSTRACT OF THE DISCLOSURE

New 5-nitrofuran derivatives of the formula:

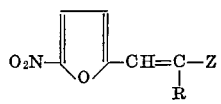

wherein R is hydrogen or alkyl and Z is a heterocyclic nucleus consisting of pyridazine, pyrimidine, pyrazine, thiazole, oxazole, triazole, benzothiazole or thiadiazole types having bacteriocidal and fungicidal properties. The heterocyclic nucleus may be substituted or unsubstituted.

---

Among the alkyl radicals comprehended by R in the foregoing formula, especially lower alkyl groups are preferred. Examples of such groups are methyl, ethyl, propyl, isopropyl, butyl, isobutyl, sec. butyl, tert. butyl, pentyl, isopentyl, neopentyl, hexyl, isohexyl, heptyl, octyl and homologous monovalent hydrocarbon radicals in chains either straight or branched.

The heterocyclic radicals, designated Z in the formula include, for example, pyridazines, pyrimidines, pyrazines, triazines, oxazoles, thiazoles, pyrazoles, triazoles, thiadiazoles and benzothiazoles, etc. The substituents in the case of the substituted ring systems include, for example, halogen, nitro, amino, acylamine, sulfonylamino, hydroxy, acyloxy or alkoxy groups.

The compounds to which this invention relate are useful because of their valuable pharmacological properties. Like other nitrofuran derivatives superficially related they are anti-microbial agents. However, it has been found that the compounds of the invention have outstanding anti-microbial properties far beyond what one would be led to expect from the teachings of the prior art. The compounds are bactericidal to the majority of pathogens found in surface infections, gram negative as well as gram positive, mixed surface infections of wounds, severe burns, pyodermias, osteomyelitis, urinary tract pathogens, etc. Additionally, the compounds of the invention are powerful fungicides and sporicides and are useful in the treatment of dermatomycoses, etc. In comparison to known nitrofuran derivatives, they exhibit especially improved effectiveness against *Staphylococcus aureus*, *Escherichia coli*, *Streptococcus aureus*, *Microsporum gypseum* and *Trichophyton mentagrophytes*.

The compounds herein disclosed can be variously obtained by methods known per se; but a preferred process comprises condensing 5-nitrofurfurole with an alkyl-substituted heterocyclene of the formula H₂C(R)-Z, R and Z having meanings hereinafore assigned. Alternatively, the compounds of the invention can also be derived by condensing the corresponding heterocyclic aldehydes or ketones with 5-nitro-2-methyl-furan.

Furthermore, it is possible in these condensation reactions to use as starting materials organo metallic derivatives: thus, for example, conversion of 5-nitro-furole with a heterocyclically substituted alkyl magnesium halide, or vice versa, by conversion of the heterocyclic aldehyde or ketone with a Grignard compound of 5-nitro-2-halogen-methyl-furan, followed by dehydration. In connection with many of the above named substituted heterocyclic rings, it is advantageous not to introduce or split off the substituent, as the case may be, until the condensation has been carried out. Thus, for example, it is advantageous to produce amino substituted compounds by saponifying the corresponding acylamino compounds.

Equivalent to the free nitrofuran derivatives of this invention for the purposes here described are the quaternary ammonium salts thereof or the corresponding N-oxides. Conversion of the free nitrofuran derivatives of the invention to the corresponding quaternary ammonium compounds and N-oxides takes place according to the conventional processes.

The following examples describe in detail certain of the compounds illustrative of the invention and methods for their manufacture. However, the invention is not to be construed as limited thereby either in spirit or in scope since it will be apparent to those skilled in the art or organic synthesis that many modifications, both of materials and of methods, may be practiced without departing from the purpose and intent of this disclosure.

EXAMPLE I 1-(5-nitro-2-furyl)-2-(6-acetamido-3-pyridazyl) - ethylene 1.51 grams of 3-methyl-6-acetamido-pyridazine are heated with 1.41 grams of 5-nitro-2-fural, 10 ml. of acetic anhydride and 10 ml. of glacial acetic acid, for 3 hours at 160° C. (bath temperature). Thereafter the mixture is evaporated to dryness in vacuo, the concentrate is taken up in water and neutralized with sodium bicarbonate, and then suction filtered. The precipitate which is recovered is heated to boiling 5 times with 15 ml. of dioxan each time. Upon cooling of the combined dioxan extracts, there is obtained 0.65 gram of crystals which melt at 290–292° C. with decomposition. An additional 0.5 gram melting at 290–291° C. is obtained from the concentrated mother liquor. Following recrystallization from pyridine, the 1-(5-nitro-2-furyl)-2-6-acetamido-3-pyridazyl)-ethylene recovered melts at 292° C.

EXAMPLE II 1-(5-nitro-2-furyl)-2-(6-amino-3-pyridazyl)-ethylene 1 gram of the acetyl compound obtained as described in Example I, together with 30 ml. of 5 N hydrochloric acid, is hydrolyzed for 1 hour at 110° C. The original suspension changes after a few minutes into a clear solution from which, after some time and while still in the hot state, there precipitates out a crystalline product. The mixture is cooled and chilled in an ice bath, whereupon the mixture is suction filtered. The product is recrystallized out of 50 ml. of water with the addition of activated charcoal and 2.5 ml. of concentrated hydrochloric acid. The yield of 1-(5-nitro-2-furyl)-2-(6-amino-3-pyridazyl)-ethylene in the form of the hydrochloride having a melting point of 290° C. amounts to 0.75 gram.

EXAMPLE III 1-(5-nitro-2-furyl)-2-(2-benzothiazolyl)-ethylene

A mixture of 2.82 grams of 2-methyl-benzothiazole, 2.82 grams of 5-nitro-2-fural and 4 grams of acetic anhydride are heated together for 2 hours at 130° C. (bath temperature). Following cooling, water is added, the mixture is neutralized with sodium bicarbonate and suction filtered. The precipitate which is recovered is washed with water. It is then boiled out several times with benzene (80 ml., 60 ml., 40 ml. and 20 ml., respectively) and the clear benzene extracting solution vacuum concentrated. The concentrate yields, following recrystallization from 20 ml. of dioxan, 1.75 grams of 1-(5-nitro-2-furyl)-2-(2-benzothiazolyl)-ethylene which melts with decomposition at 202–204° C.

EXAMPLE IV 1-(5-nitro-2-furyl)-2-(4-pyrimidyl)-ethylene 0.48 gram 4-methyl-pyrimidine, 0.92 gram acetic acid, 1.05 grams acetic anhydride and 0.72 gram 5-nitro-2-fural are heated together for 1 hour to a temperature of 130° C. (bath temperature). Following cooling, water is added, the mixture is neutralized with sodium bicarbonate and suction filtered. The precipitate is washed with water. The raw product is then boiled out 3 times with benzene (30 ml., 15 ml. and 15 ml.) and the clear benzene solution is vacuum concentrated. The concentrate yields, following recrystallization from 8.5 ml. of dioxan, 0.45 gram of 1-(5-nitro-2-furyl)-2-(4-pyrimidyl)-ethylene, having a melting point of 223–224° C.

EXAMPLE V 1-(5-nitro-2-furyl)-2-(6-methoxy-3-pyridazyl) - ethylene 12.3 grams of acetic anhydride and 8.5 grams of 5-nitro-2-fural are heated for 3 hours at 160° C. (bath temperature). Thereafter the mixture is dried in vacuo and the remaining black residue is taken up with water and neutralized with sodium bicarbonate. After suction filtering, washing with water and drying, the material remaining is boiled out 5 times with 1 ml. portions of benzene, and then 4 times with 50 ml. portions of benzene. 2.2 grams of crystals having a melting point of 185–190° C. precipitate from the cooled, clear benzene filtrate. The mother liquor, on vacuum concentration, produces 3.4 grams of residue which, after recrystallization from 60 ml. of toluene, yields 2.2 grams of crystals having a melting point of 185–190° C. 1.6 grams of the combined crystalline products are dissolved in 20 ml. of chloroform. A small amount of undissolved crystals remaining is removed, and the solution is poured into a column (about 40 cm. long) of neutral aluminum oxide (about 100 times the amount by weight) mixed with benzene to a pasty consistency. The column is eluted with benzene until two yellow, well separated zones have formed. The column is then severed between these zones and the lower part is extracted with chloroform. Upon stripping of the solvent, 1.1 grams of 1-(5-nitro-2-furyl)-2-(6-methoxy-3-pyridazyl)-ethylene, having an M.P. of 202–203° C., is obtained.

EXAMPLE VI

N-oxide of 1-(5-nitro-2-furyl)-2-(6-methoxy-3-pyridazyl)-ethylene 0.1 gram of the product obtained in accordance with Example V is dissolved in 3.3 ml. of chloroform and 4.3 ml. of a solution of 0.07 gram perbenzoic acid in chloroform are added. The mixture is allowed to stand for 4 days at room temperature, and the crystalline product that is precipitated out is separated by suction filtering. After washing with chloroform and drying, 0.1 gram of the N-oxide is obtained, having a melting point of 244–245° C. At about 180° C. the orange colored substance gradually turns dark brown.

EXAMPLE VII 1-(5-nitro-2-furyl)-2-(6-methylsulfonylamido-3-pyridazyl)-ethylene (a) 4.36 grams of 6-amino-3-methyl-pyridazine are suspended in 60 ml. of absolute dioxan and 30 ml. of triethylamine and a solution of 10 grams of methanesulfochloride in 50 ml. of absolute dioxan is added thereto in dropwise fashion, with stirring, over a period of 1 hour. The stirring is continued for another hour at 50° C. The crystalline product obtained is suction filtered at room temperature and washed with dioxan. The vacuum-concentrated filtrate produces 11.4 grams of a residue which, after extraction with water, yields 5.6 grams of 3-methyl-6-(bis-methylsulfonyl)-amino-pyridazine having a melting point of 194–196° C.

1.9 grams of this compound are hydrolyzed with an excess of 0.5 N caustic soda solution for 20 minutes at room temperature. The small amount of undissolved compound remaining is removed by filtering and the filtrate is acidified to about pH 3 with strong hydrochloric acid and vacuum dried and then dissolved in benzene several times and redried in a vacuum. The totally dry concentrate is thereafter extracted three times with acetic acid ester. 0.95 gram of crude 3-methyl-6-methylsulfonyl-amido-pyridazine, having a melting point of 146–150° C., is thereby obtained.

0.94 gram of this crude product is heated for 3 hours at 160° C. (bath temperature) with 0.7 gram of 5-nitro-2-fural and a mixture of 5 ml. of glacial acetic acid and 5 ml. of acetic anhydride. The cooled mixture is treated with water and neutralized with sodium bicarbonate. The aqueous phase is decanted and the organic residue is extracted with chloroform. 0.3 gram of substance remains undissolved. The extract is boiled with dioxan and the clear filtrate is concentrated by evaporation. In this manner, 0.06 gram of 1-(5-nitro-2-furyl)-2-(6-methylsulfonylamido-3-pyridazyl)-ethylene, having a melting point of 242 to 244° C. is obtained. After recrystallization from ethylene glycol monomethylether, the compound recovered melts at 255–257° C.

(b) It is not necessary to saponify the 3-methyl-6-(bis-methylsulfonyl)-amino-pyridazine to form the mono-methylsulfonyl compound prior to the condensation and, instead, the bis-methylsulfonyl compound can advantageously be condensed directly with the 5-nitro-2-fural, applying the same reaction conditions as under (a) above. In this manner, 1-(5-nitro-2-furyl)-2-[6-(bis-methylsulfonyl)-amino-3-pyridazyl]-ethylene, having a melting point of 198–199° C., is obtained. If a solution of this bis compound in dioxan is treated briefly in the cold with 0.1 N caustic soda solution, followed by acidification, there will be precipitated 1-(5-nitro-2-furyl)-2-(6-methylsulfonylamido-3-pyridazyl) - ethylene, having an M.P. of 253–255° C.

(c) A further and alternative method for the manufacture of 1-(5-nitro-2-furyl)-2-(6-methylsulfonylamide-3-pyridazyl)-ethylene comprises dissolving the 1-(5-nitro-2-furyl)-2-(6-amino-3-pyridazyl) - ethylene hydrochloride produced as in Example II in pyridine and treating the solution with methane sulfochloride in the presence of triethylamine at room temperature. After purification, as detailed in Example 7(a) in connection with 6-amino-3-methyl-pyridazine, 1 - (5-nitro-2-furyl)-2-[6-(bis-methylsulfonyl)-amino-3-pyridazyl]-ethylene, having an M.P. of 198–199° C., is obtained which can be saponified as described above under 7(b) to form 1-(5-nitro-2-furyl)-2-(6-methylsulfonylamido-3-pyridazyl)-ethylene.

EXAMPLE VIII 1-(5-nitro-2-furyl)-2-(5-amino-1,3,4-thiadiazolyl-2)-ethylene 27.2 grams of 5-methyl-2-amino-1,3,4-thiadiazole are heated with 150 grams of acetic anhydride for 10 minutes at 160° C. 36.2 grams of 5-nitro-2-fural are then added and the mixture is heated under reflux for 4 hours (160° C. bath temperature). The mixture is then allowed to cool and suction filtered. The residue is washed with glacial acetic acid and dried, yielding 51.7 grams of N-acetyl compound of 1-(5-nitro-2-furyl)-2-(5-amino,1,3,4-thiadiazolyl-2)-ethylene. The compound can be recrystallized from dimethyl formamide and melts at 290° C. (black color).

$C_{10}H_8N_4O_4S$ (280): Calculated: N, 20.0%; S, 11.43%. Actual: N, 19.85%; S, 11.2%.

In studies carried out to determine the comparative toxicity, the compounds of the invention were compared with Furacin and Furadantin [N-(5-nitro-2-furfurylidene) 1-amino-hydantoin], Eaton Labs., Norwich, New York. 1 - (5 - nitro - 2 - furyl) - 2 - (6 - amino - 3 - pyridazyl) ethylene was found to be about ⅓ as toxic as Furacin and as about ⅕ as toxic as Furadantin. 1-(5-nitro-2-furyl)-2- (5 - amino - 1,3,4 - thiadiazolyl - 2) - ethylene was less than 1/12 as toxic as Furacin and less than 1/20 as toxic as Furadantin. These figures represent data obtained in acute toxicity studies following oral administration in the mouse and which were reported in terms of $LD_{50}$. Furthermore, it has been found that the dose, which when administered orally to the dog produces vomiting in the case of Furadantin can be increased in the case of 1-(5-nitro - 2 - furyl) - 2 - (5 - amino - 1,3,4 - thiadiazolyl - 2)-ethylene about twenty fold before vomiting occurs.

EXAMPLE XVII 1-(5-nitro-2-furyl)-2-[6-(β,γ-dihydroxy-n-propoxy)-3-pyridazyl]-ethylene 8.7 g. of monosodium glycerine are dissolved in 48 ml. of warm dry glycerine, and 10.85 g. of a mixture of 3-methyl - 6 - chloropyridazine and 3 - methyl - 6 - bromopyridazine (ca. 2:1) are added thereto. The resulting mixture is heated for 2 hours at a bath temperature of 150° C. After cooling, 150–200 ml. water are added, and the solution is saturated with potassium carbonate, while cooling. The oil which has separated is extracted with chloroform, and the extract, after drying over sodium sulfate, evaporated in a vacuum. As residue there are obtained 9.2 g. (65.7% of theory) of a viscous oil which becomes crystallized after some hours standing. This product is the 3 - methyl - 6 - (β,γ - dihydroxy - n - propoxy) pyridazine which after trituration with dioxane/chloroform (1:1) melts at 74–76° C.

9.2 g. of the oily crude product are heated for 10 minutes at a bath temperature of 160° C. with 67.5 ml. acetic anhydride, 7.05 g. of crude 5-nitro-2-fural added thereto and the reaction mixture boiled under reflux at a bath temperature of 160° C. for a further 3 hours. The excess acetic anhydride is evaporated in a vacuum, and the residue triturated with benzene. The small amount of undissolved material is separated off and the benzene solution evaporated in a vacuum. The residue is again dissolved in benzene and diluted with much ether. The precipitated flocculent material is filtered off and the filtrate evaporated in a vacuum. The oily residue is the 1 - (5 - nitro - 2 - furyl) - 2 - [6 - (β,γ - diacetoxy - n-propoxy)-3-pyridazyl]-ethylene.

Yield: 16.25 g. (83.3 percent of theory).

What is claimed is:
1. 1 - (5 - nitro - 2 - furyl) - 2 - (6 - amino - 3 - pyridazyl)-ethylene.
2. 1 - (5 - nitro - 2 - furyl) - 2 - (6 - acetamido - 3-pyridazyl)-ethylene.
3. 1 - (5 - nitro - 2 - furyl) - 2 - (5 - methylureido - 1,3, 4-thiadiazolyl-2)-ethylene.
4. 1 - (5 - nitro - 2 - furyl) - 2 - (6 - dimethylolmethyl-amino-3-pyridazyl)-ethylene.
5. 1 - (5 - nitro - 2 - furyl) - 2 - (5 - amino - 1,3,4 - thiadiazolyl-2)-ethylene.
6. 1 - (5 - nitro - 2 - furyl) - 2 - (4 - pyrimidyl) - ethylene.
7. 1 - (5 - nitro - 2 - furyl) - 2 - (6 - methylmercapto-3-pyridazyl)-ethylene.
8. N - oxide of the compound 1 - (5 - nitro - 2 - furyl) 2-(6-methoxy-3-pyridazyl)-ethylene.
9. The compound of the formula:

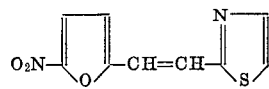

10. 1 - (5 - nitro - 2 - furyl) - 2 - (2 - benzothiazolyl)-ethylene.

References Cited

UNITED STATES PATENTS

| 3,359,262 | 12/1967 | Takamatsu et al. | 260—240 |
| 3,146,232 | 8/1964 | Saikachi et al. | 260—240 |
| 3,151,110 | 6/1964 | Kodama et al. | 260—240 |

FOREIGN PATENTS

| 759,378 | 10/1956 | Great Britain. |
| 1,310,114 | 10/1962 | France. |
| 613,604 | 8/1962 | Belgium. |

OTHER REFERENCES

Saikawa et al., Vakugaku Zasshi, vol. 84, pages 225 to 229 (March 1964).

Ried et al., Annalen der Chemie, vol. 600, pp. 47 to 59 (1956).

JOHN D. RANDOLPH, Primary Examiner

U.S. Cl. X.R.

260—999

Boehr. 220
PF/ey
PO-1050
(5/69)

UNITED STATES PATENT OFFICE
CERTIFICATE OF CORRECTION

Patent No. 3,491,091     Dated January 20, 1970

Inventor(s) Herbert Berger, Erich Haack, Johann Daniel Achelis
Wolfgang Vomel

It is certified that error appears in the above-identified patent and that said Letters Patent are hereby corrected as shown below:

Column 2, line 44, "1-(5-nitro-2-furyl)-2-6-acetamido" etc
should be -- 1-(5-nitro-2-furyl)-2-(6-acetamido --

Column 7, line 14, "acetic ester" should be
-- acetic acid ester --.

SIGNED AND
SEALED

JUN 23 1970

(SEAL)
Attest:

Edward M. Fletcher, Jr.           WILLIAM E. SCHUYLER, JR.
Attesting Officer                 Commissioner of Patents